(12) United States Patent
Fukui

(10) Patent No.: US 9,392,242 B2
(45) Date of Patent: Jul. 12, 2016

(54) IMAGING APPARATUS, METHOD FOR CONTROLLING IMAGING APPARATUS, AND STORAGE MEDIUM, FOR UNDERWATER FLASH PHOTOGRAPHY

(71) Applicant: CANON KABUSHIKI KAISHA, Tokyo (JP)

(72) Inventor: Takaaki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 13/732,618

(22) Filed: Jan. 2, 2013

(65) Prior Publication Data

US 2013/0176416 A1    Jul. 11, 2013

(30) Foreign Application Priority Data

Jan. 6, 2012   (JP) .................. 2012-001537

(51) Int. Cl.
  *H04N 9/73*   (2006.01)
(52) U.S. Cl.
  CPC ..................... *H04N 9/735* (2013.01)
(58) Field of Classification Search
  None
  See application file for complete search history.

(56) References Cited

U.S. PATENT DOCUMENTS

| 5,438,363 | A | * | 8/1995 | Ejima et al. | 348/223.1 |
| 5,550,587 | A | * | 8/1996 | Miyadera | H04N 1/2137 348/223.1 |
| 2003/0156206 | A1 | * | 8/2003 | Ikeda | H04N 9/73 348/223.1 |
| 2006/0114335 | A1 | * | 6/2006 | Hara | H04N 9/735 348/223.1 |
| 2011/0187890 | A1 | * | 8/2011 | Takayama et al. | 348/223.1 |
| 2011/0228074 | A1 | * | 9/2011 | Parulski et al. | 348/81 |

FOREIGN PATENT DOCUMENTS

| JP | H06-351025 A | 12/1994 |
| JP | 3528202 B2 | 5/2004 |
| JP | 4144390 B2 | 9/2008 |

* cited by examiner

*Primary Examiner* — Kevin McInnish
(74) *Attorney, Agent, or Firm* — Canon U.S.A., Inc. IP Division

(57) ABSTRACT

An imaging apparatus configured to perform white balance correction on an image captured with flash emission includes an object region specifying unit configured to specify an object region irradiated with flash by the flash emission, a first white balance coefficient calculation unit configured to calculate a first white balance coefficient based on a light amount of flash for the object region specified by the object region specifying unit and a light amount of external light, an object distance calculation unit configured to calculate an object distance when imaging with the flash emission includes underwater photography, and a second white balance coefficient calculation unit configured to calculate a second white balance coefficient from the first white balance coefficient and the object distance calculated by the object distance calculation unit when the object distance calculated by the object distance calculation unit is equal to or less than a predetermined distance.

7 Claims, 14 Drawing Sheets

FIG. 7A

| CORRELATION COEFFICIENT $r^2$ | Cx1 | Cy1 | Cx2 | Cy2 |
|---|---|---|---|---|
| Co1 | A1 | B1 | C1 | D1 |
| Co2 | A2 | B2 | C2 | D2 |
| Co3 | A3 | B3 | C3 | D3 |
| Co4 | A4 | B4 | C4 | D4 |
| Co5 | A5 | B5 | C5 | D5 |

FIG. 7B

| CORRELATION COEFFICIENT $r^2$ | Cx1D | Cy1D | Cx2D | Cy2D |
|---|---|---|---|---|
| Co1 | A1D | B1D | C1D | D1D |
| Co2 | A2D | B2D | C2D | D2D |
| Co3 | A3D | B3D | C3D | D3D |
| Co4 | A4D | B4D | C4D | D4D |
| Co5 | A5D | B5D | C5D | D5D |

IMAGING APPARATUS, METHOD FOR CONTROLLING IMAGING APPARATUS, AND STORAGE MEDIUM, FOR UNDERWATER FLASH PHOTOGRAPHY

BACKGROUND OF THE INVENTION

1. Field of the Invention

The present invention relates to an imaging apparatus, a method for controlling the imaging apparatus, and a storage medium. In particular, the present invention relates to underwater flash photography.

2. Description of the Related Art

A digital camera, as an example of an imaging apparatus, digitizes a signal output from an image sensor via A/D conversion and divides the signal into a plurality of blocks. The block signals include color signals including red (R), green (G), and blue (B), and, for example, color evaluation values of the blocks are calculated by Expression (1):

$$Cx[i]=(R[i]-B[i])/Y[i] \times 1024,$$

and $$Cy[i]=(R[i]+B[i]-2G[i])/Y[i] \times 1024 \qquad (1)$$

(where $Y[i]=R[i]+2G[i]+B[i]$).

The digital camera determines that a block is white when a color evaluation value ($Cx[i]$, $Cy[i]$) is included in a predetermined white detection range. Then, the digital camera calculates integrated values sumR, sumG, and sumB of color pixels included in the white detection range and calculates white balance coefficients according to Expression (2) below:

$$WBCo\_R = sumY \times 1024/sumR$$

$$WBCo\_G = sumY \times 1024/sumG,$$

and $$WbCo\_B = sumY \times 1024/sumB, \qquad (2)$$

where sumY=(sumR+2×sumG+sumB)/4

However, when photography is performed underwater, a long wavelength band of light easily attenuates due to the influence of spectral transmittance of water. Therefore, the ratio of R light decreases compared to G light and B light, and thus a bluish image may be obtained.

Further, as a distance between the surface of water and a camera or an object (a depth from the surface of water) is longer underwater, the R component of natural light reaching from the outside of water reduces. Therefore, it is difficult to maintain the following property of white balance.

An electronic camera discussed in Japanese Patent No. 4144390 sets an adjustment coefficient used at the time of adjusting the white balance before photography and controls other white balance adjustment coefficients based on depth information detected by an indicator for depth that detects a depth where a camera is located.

In underwater photography, when the water depth is deep, a color is rarely produced due to the above-described reason. When the water depth is approximately greater than 10 meters, the color is not produced and an image close to gray is formed even if the white balance is adjusted. A flash unit emits light during underwater photography to avoid such an issue, and, accordingly, a desirable color-reproduced image can be obtained.

On the other hand, an electronic still camera discussed in Japanese Patent No. 3528202 estimates a tint variation amount of the flash caused by an optical path length and, according to the distance to an object, varies a white balance control value when adjusting the white balance underwater.

When flash photography is performed underwater and the white balance is appropriately controlled for a main object, the main object turns to an image with an appropriate white balance. However, assume that, for example, when an object, such as a coral or a rock, is present particularly at a macro distance equal to or less than 50 cm in front of the main object, or, when flash is not emitted at a suitable angle because of an external flash or the like, a region having illuminance higher than the main object and irradiated with flash is present. In this case, in an object in front of the main object or the region having high illuminance, red is enhanced than that in the main object. Thus, there arises an issue that an unnatural image is obtained.

Since the color of the water is blue underwater, the sense of discomfort is small when the color of the image is changed to blue. However, when red is produced, an unnatural image for which the sense of discomfort is large may be formed. In order to resolve such an issue, Japanese Patent No. 4144390 discusses a method of controlling white balance at the time of non-flash emission. According to this method, the issue with white balance control at the time of flash emission cannot be resolved. Further, the goal of Japanese Patent No. 3528202 is to control the white balance according to a distance to the main object and match the tint of the main object. Likewise, since an appropriate process is not performed on the above-described defective image, a desirable image may not be obtained.

SUMMARY OF THE INVENTION

The present invention is directed to an imaging apparatus capable of appropriately adjusting white balance at the time of underwater flash emission.

According to an aspect of the present invention, an imaging apparatus configured to perform white balance correction on an image captured with flash emission includes an object region specifying unit configured to specify an object region irradiated with flash by the flash emission, a first white balance coefficient calculation unit configured to calculate a first white balance coefficient based on a light amount of flash for the object region specified by the object region specifying unit and a light amount of external light, an object distance calculation unit configured to calculate an object distance when imaging with the flash emission includes underwater photography, and a second white balance coefficient calculation unit configured to calculate a second white balance coefficient from the first white balance coefficient and the object distance calculated by the object distance calculation unit when the object distance calculated by the object distance calculation unit is equal to or less than a predetermined distance.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A and 7B are diagrams illustrating tables regarding setting of the underwater axis corresponding to correlation coefficients.

DESCRIPTION OF THE EMBODIMENTS

Various exemplary embodiments, features, and aspects of the invention will be described in detail below with reference to the drawings.

Figure 1:
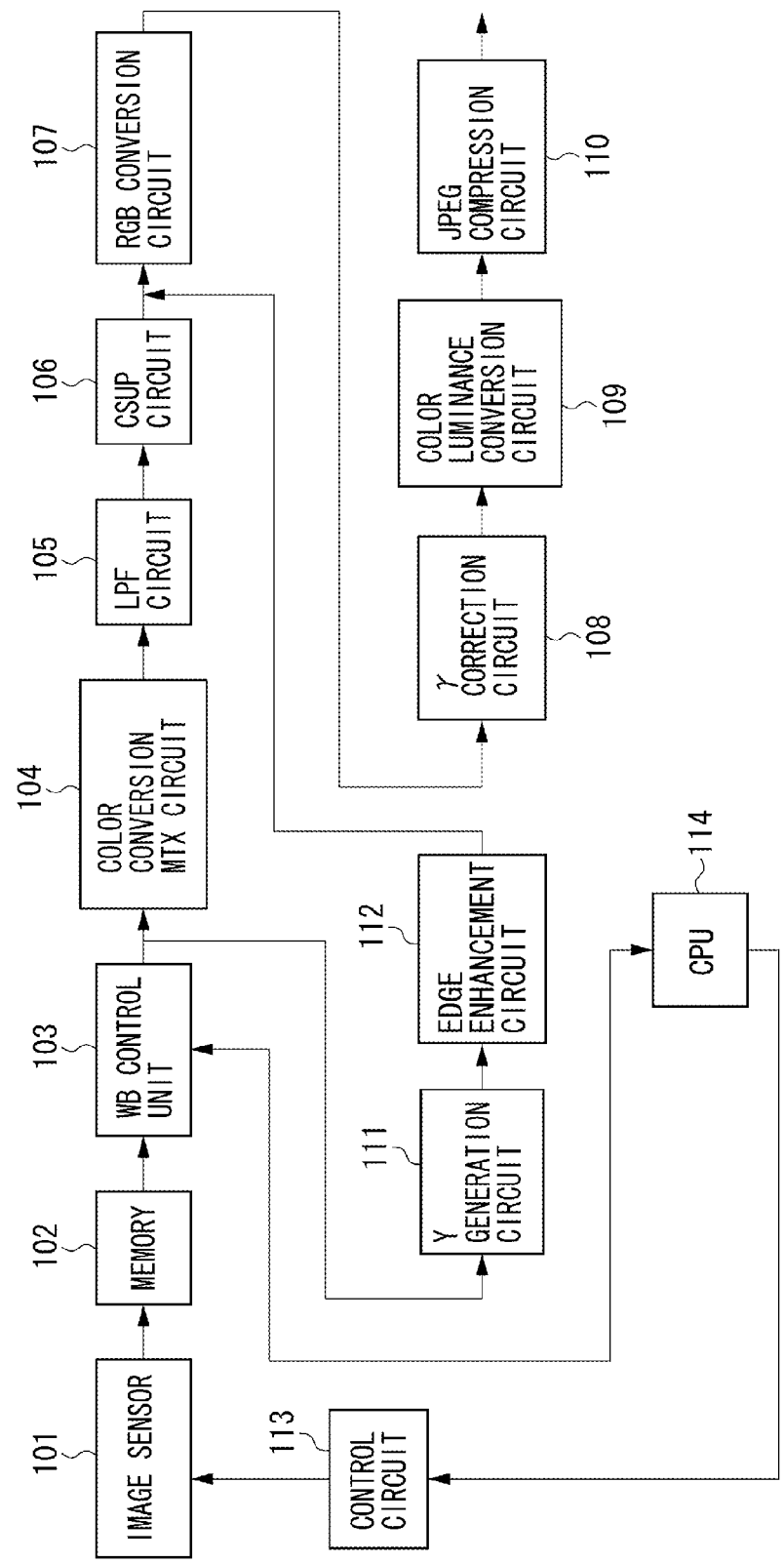
FIG. 1 is a block diagram illustrating a configuration of a camera according to an exemplary embodiment of the invention.

A digital camera (hereinafter, referred to as a camera) will be described as an example of an imaging apparatus according to an exemplary embodiment of the invention. FIG. 1 is a block diagram illustrating a configuration of the camera according to the exemplary embodiment.

The camera includes a solid-state image sensor 101, a memory 102, a white balance (WB) control unit 103, a color conversion matrix (MTX) circuit 104, a low-pass filter (LPF) circuit 105, a chroma suppress (CSUP) circuit 106, a red-green-blue (RGB) conversion circuit 107, a gamma (γ) correction circuit 108, a color luminance conversion circuit 109, and a JPEG compression circuit 110. The camera further includes a luminance signal (Y) generation circuit 111, an edge enhancement circuit 112, a control circuit 113, and a central processing unit (CPU) 114.

The solid-state image sensor 101 includes, for example, a CCD or CMOS sensor. The surface of the solid-state image sensor 101 is covered with, for example, color filters of the RGB (red, green, and blue) array as a Bayer array, so that the solid-state image sensor 101 can perform color photography. The CPU 114 calculates a shutter speed and an aperture value for an appropriate brightness of the entire image and also calculates a driving amount of a focus lens in an imaging lens to be focused on an object present within a focusing area. The exposure values (the shutter speed and the aperture value) and the driving amount of the focus lens calculated by the CPU 114 are transmitted to the control circuit 113, so that the exposure and focus are controlled based on the respective values.

The WB control unit 103 calculates a white balance correction value based on information regarding an image signal stored in the memory 102 and performs white balance correction on the image signal stored in the memory 102 using the calculated white balance correction value. The detailed configuration of the WB control unit 103 and a method of calculating the white balance correction value will be described below. The color conversion MTX circuit 104 performs conversion into color difference signals R-Y and B-Y by multiplying a color gain so that the image signal subjected to white balance correction by the WB control unit 103 is reproduced with an optimum color.

The LPF circuit 105 restricts the bands of the color difference signals R-Y and B-Y. The CSUP circuit 106 suppresses a false color signal of a saturated portion in the image signal of which the bands are restricted by the LPF circuit 105. On the other hand, the image signal subjected to the white balance correction by the WB control unit 103 is also output to the Y generation circuit 111 to generate a luminance signal Y, so that an edge enhancement process is performed on the generated luminance signal Y by the edge enhancement circuit 112.

The color difference signals R-Y and B-Y output from the CSUP circuit 106 and the luminance signal Y output from the edge enhancement circuit 112 are converted into RGB signals by the RGB conversion circuit 107 and are subjected to gradation correction by the γ correction circuit 108. Thereafter, the RGB signals are converted into YUV signals by the color luminance conversion circuit 109 to be compressed by the JPEG compression circuit 110. Then, the compressed signals are stored as image signals on an external recording medium or an internal recording medium.

Figure 2:
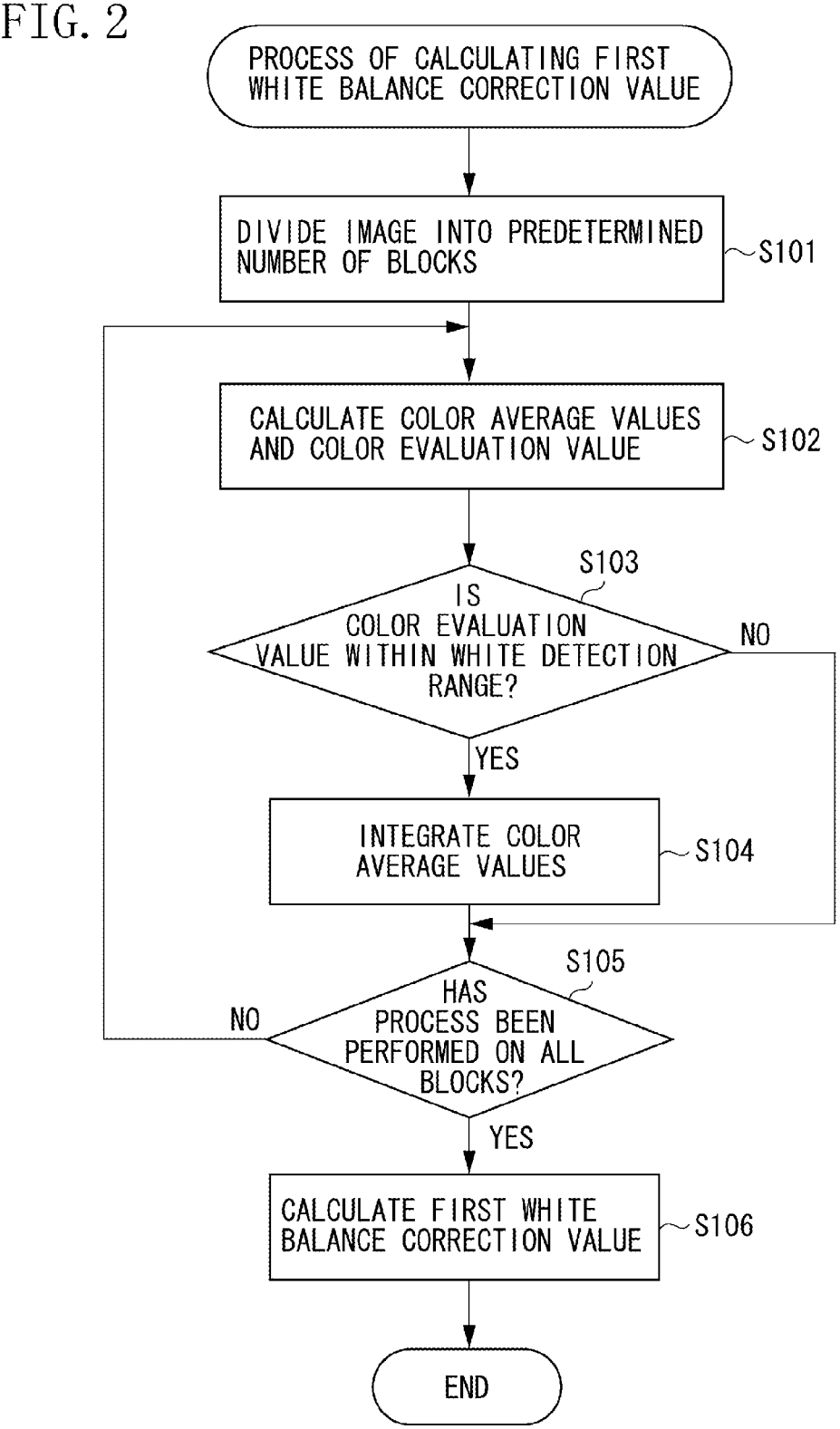
FIG. 2 is a flowchart illustrating a process of calculating a white balance correction value.

Next, a method for calculating a white balance correction value by the WB control unit 103 will be described in detail with reference to the flowchart in FIG. 2. In step S101, the WB control unit 103 reads the image signal stored in the memory 102 and divides the image into m blocks.

In step S102, the WB control unit 103 calculates color average values (R[i], G[i], and B[i]) by averaging the pixel values for the respective colors in each of the blocks (1 to m), so that the WB control unit 103 calculates color evaluation values (Cx[i] and Cy[i]) using Expression (3) below:

$$Cx[i]=(R[i]-B[i])/Y[i] \times 1024,$$

and $$Cy[i]=(R[i]+B[i]-2G[i])/Y[i] \times 1024, \quad (3)$$

where $Y[i]=R[i]+2G[i]+B[i]$.

Figure 3A:
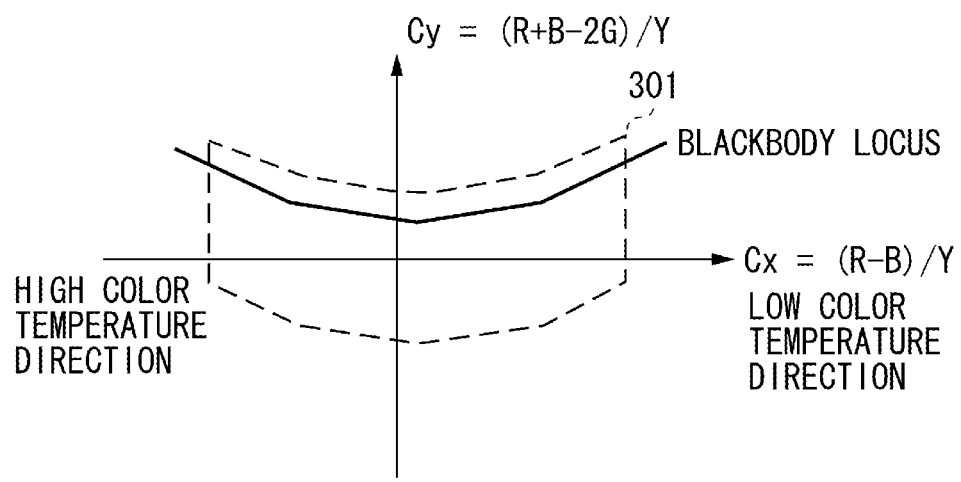
FIGS. 3A and 3B are diagrams illustrating a white detection range.

In step S103, the WB control unit 103 determines whether the color evaluation values (Cx[i] and Cy[i]) of an i-th block calculated in step S102 are included in a predetermined white detection range 301 illustrated in FIG. 3A.

Figure 3B:
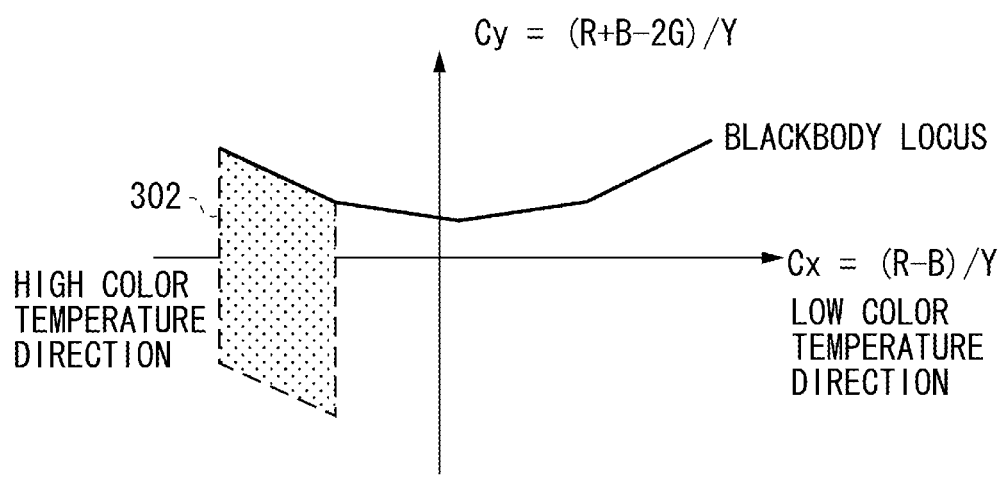

Here, the white detection range 301 illustrated in FIG. 3A is a range obtained by photographing white under different light sources in advance and plotting calculated color evaluation values. The white detection range may be separately set depending on a photographing mode. A value in the negative direction of the x coordinate (Cx) illustrated in FIGS. 3A and 3B is a color evaluation value when white of a high-color temperature object is photographed. A value in the positive direction of the x coordinate (Cx) is a color evaluation value when white of a low-color temperature object is photographed. Further, the y coordinate (Cy) means the degree of a green component of a light source, and thus a green component increases in the negative direction, which indicates the light source is a fluorescent light. A white distribution at the underwater time ranges to be biased in the blue direction and the green direction. Therefore, a white detection range is set so that components in the blue direction and the green direction are detected (a white detection range 302 illustrated in FIG. 3B).

When the calculated color evaluation values (Cx[i] and Cy[i]) are included in the white detection range 302 illustrated in FIG. 3B (YES in step S103), the block is determined to be white and the process proceeds to step S104. When the calculated color evaluation values (Cx[i] and Cy[i]) are not included in the white detection range 302 (NO in step S103), the process proceeds to step S105. In step S104, the WB control unit 103 integrates the color evaluation values (R[i], G[i], and B[i]) of the block. Therefore, when the calculated color evaluation values (Cx[i] and Cy[i]) are not included in the white detection range 302, the process proceeds to step S105 without the addition.

The processes of step S103 and step S104 can be expressed by Expression (4) below:

$$SumR = \sum_{i=0}^{m} Sw[i] \times R[i]$$

$$SumG = \sum_{i=0}^{m} Sw[i] \times G[i]$$

$$SumB = \sum_{i=0}^{m} Sw[i] \times B[i]$$

(4)

In Expression (4), when the color evaluation values (Cx[i] and Cy[i]) are included in the white detection range 302, Sw[i] is set to 1. When the color evaluation values (Cx[i] and Cy[i]) are not included in the white detection range 302, Sw[i] is set to 0. Thus, the process of performing or not performing the addition of the color valuation values (R[i], G[i], and B[i]) depending on the determination of step S103 is performed in practice.

In step S105, the WB control unit 103 determines whether the above-described process is performed on all of the blocks. When an unprocessed block remains (NO in step S105), the process returns to step S102 and the above-described process is repeated. When the process has been performed on all of the blocks (YES in step S105), the process proceeds to step S106.

In step S106, the WB control unit 103 calculates first white balance correction values (WBCo1_R, WBCo1_G, and WBCo1_B) from the obtained integrated values (sumR, sumG, and sumB) of the color evaluation values by Expression (5) below:

WBCo1_R=sumY×1024/sumR,

WBCo1_G=sumY×1024/sumG, and

WBCo1_B=sumY×1024/sumB, (5)

where sumY=(sumR+2×sumG+sumB)/4.

Next, a process after the calculation of white balance correction values will be described with reference to the flowchart in FIG. 4 and the diagram in FIG. 5. In step S202, the WB control unit 103 determines whether a WB mode is an underwater mode. When the WB mode is not the underwater mode (NO in step S202), the process proceeds to step S205. When the WB mode is the underwater mode (YES in step S202), the process proceeds to step S203.

In step S205, the WB control unit 103 sets the first white valance correction values to a white balance coefficient of external light.

On the other hand, in step S203, the WB control unit 103 estimates a water depth and sets a white locus (an underwater axis) according to the water depth at the underwater time. More specifically, the WB control unit 103 divides captured image into n blocks and calculates color average values (R[i], G[i], and B[i]) by averaging the pixel values for respective colors in each of the blocks (1 to n). Then, the color evaluation values (Cx[i] and Cy [i]) are calculated. As in FIG. 5, the color evaluation values are ranged as in an area 501 when the water depth (a depth) is shallow. The color evaluation values are ranged as in an area 502 when the water depth is deep. As the distance between the position (which may be considered as the position of a camera when a distance up to an object is close) of the object from the surface of water is longer under water, the R color component of natural light reaching from the outside of water decreases. Therefore, a distribution illustrated in FIG. 5 is obtained.

Therefore, a water depth estimation unit that estimates a water depth calculates a correlation of a straight-line approximation expression from color distribution information of the captured image and estimates the water depth from the correlation. A correlation calculation expression is Expression (6) below:

$$r^2 = \frac{\left(\sum_{i=1}^{i=n}(Cx[i]-m)(Cy[i]-n)\right)^2}{\sum_{i=1}^{i=n}(Cx[i]-m)^2 \sum_{i=1}^{i=n}(Cy[i]-n)^2}$$

(6)

In Expression (6), m is the average value of Cx[i] and n is the average value of Cy[i]. The calculated $r^2$ is set as a correlation coefficient and the white balance control is performed based on this information. The correlation coefficient takes values from 0 to 1. When the correlation coefficient is close to 1, there is correlation, that is, the water depth is estimated to be deep. When the correlation coefficient is close to 0, there is no correlation, that is, the water depth is estimated to be shallow.

Another water depth estimation unit that estimates a water depth from the color distribution information may estimate a water depth based on a distance between the color distribution of captured images and a blackbody locus. This is because the color distribution transitions in the blue and green directions as the water depth is deeper, as in FIG. 5. Here, it is assumed that a water depth is estimated based on a distance between the center of the color distribution of the captured images and the blackbody locus.

When a distance between the center of the color distribution and the blackbody locus is assumed to be ΔCx, ΔCy, the calculation expression is Expression (7) below:

$$AveCx = \frac{\sum_{i=1}^{n} Cx[i]}{n}$$

(7)

$$AveCy = \frac{\sum_{i=1}^{n} Cy[i]}{n}$$

$$\Delta Cx = Cx0 - AveCx$$

$$\Delta Cy = Cy0 - AveCy$$

In this expression, it is assumed that W0 (Cx0, Cy0) is a point on the blackbody locus. ΔCx and ΔCy calculated by the above expression is assumed to be a determination factor of the water depth estimation.

Figure 6:
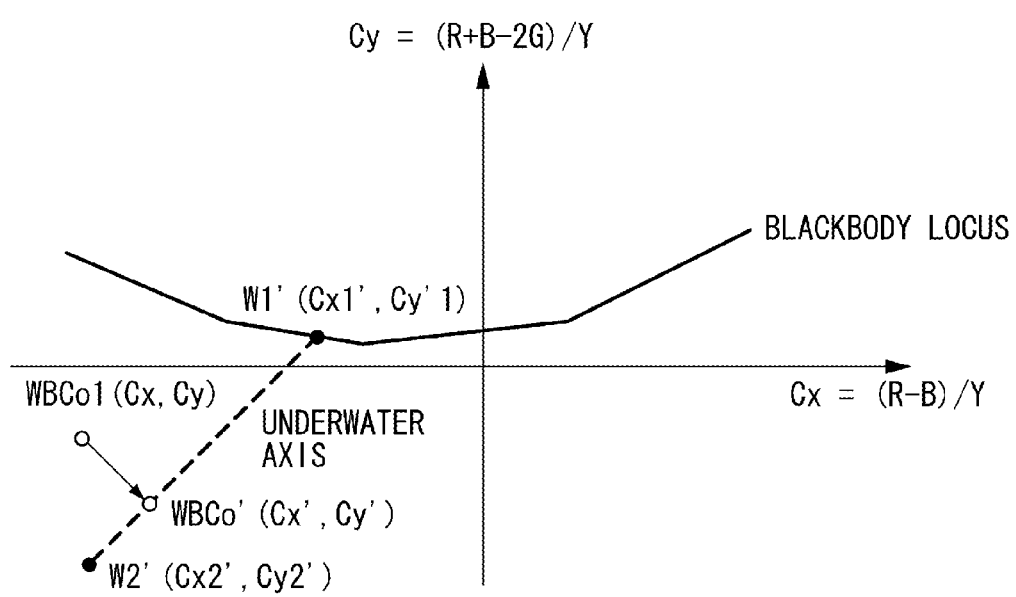
FIG. 6 is a diagram illustrating the concept of a process of setting an underwater axis.

The underwater axis is present to be separated from the blackbody locus illustrated in FIG. 6. Since an underwater white point varies depending on the water depth, underwater axis W1' and W2' is set based on the correlation coefficient (estimated water depth information) obtained by the above-described calculation and the distance (the estimated water depth information) between the center of the color distribution and the blackbody locus. As a setting method, W1 (Cx1, Cy1), W2 (Cx2, Cy2), W1D (Cx1D, Cy1D), and W2D (Cx2D, Cy2D) according to the correlation coefficients illustrated in FIGS. 7A and 7B are referred to in the tables. W1D and W2D are setting values of the underwater axis which can be tracked up to water depths deeper than W1 and W2.

Figure 9:
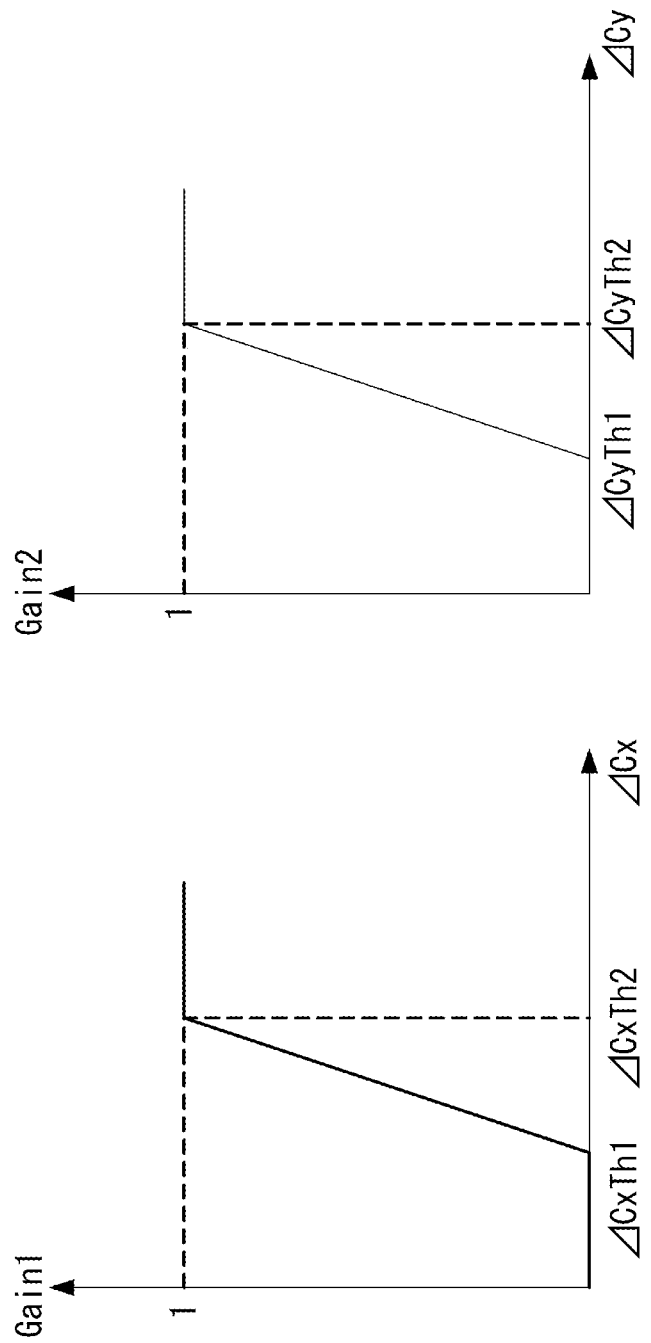
FIG. 9 is a diagram illustrating the concept of a gain calculating process of determining a mixture ratio.

The W1, W2, W1D, and W2D calculated in the tables are mixed according to the change amounts ΔCx and ΔCy of the distance between the center of the color distribution and the blackbody locus. The mixture ratio β is calculated as follows by calculating Gain 1 and Gain 2 from ΔCx and ΔCy, respectively, as illustrated in FIG. 9:

$$\beta = Gain1 \times Gain2,$$

$$W1'Cx = (1-\beta) \times W1Cx + \beta \times W1DCx,$$

$$W1'Cy = (1-\beta) \times W1Cy + \beta \times W1DCy,$$

$$W2'Cx = (1-\beta) \times W2Cx + \beta \times W2DCx,$$

and $$W2'Cy = (1-\beta) \times W2Cy + \beta \times W2DCy$$

That is, when the correlation coefficient of the color distribution information is high and the distance between the center of the color distribution and the blackbody locus is distant, it is determined that the water depth is deep. Therefore, an underwater axis which may be tracked more deeply is set. For example, a relation between the correlation coefficient in the tables illustrated in FIGS. 7A and 7B and the axis can be experimentally obtained using an image actually captured under water. When the correlation coefficient takes values other than the values in the tables illustrated in FIGS. 7A and 7B, the correlation coefficient is calculated from linear interpolation.

In step S204, the WB control unit 103 maps the white balance correction value WBCo1_calculated in step S106 to the underwater axis W1' and W2' illustrated in FIG. 6. Next, the WB control unit 103 sets the mapped point WBCo' (Cx', Cy') to WBCo1_R, WBCo1_G, and WBCo1_B and outputs WBCo1_R, WBCo1_G, and WBCo1_B to white balance coefficients under water.

In step S206, the WB control unit 103 determines whether flash is emitted at the time of main exposure. When the flash is not emitted (NO in step S206), the process proceeds to step S208. When the flash is emitted (YES in step S206), the process proceeds to step S207.

In step S208, the WB control unit 103 sets the white balance coefficients calculated in step S204 and step S205 to white balance coefficients of external light. That is, when the WB mode is the underwater mode, the white balance coefficients under water are set to the white balance coefficients of external light. When the WB mode is not the underwater mode, the first white balance correction values are set to the white balance coefficients of the external light. On the other hand, in step S207, the WB control unit 103 performs a process of calculating a white balance coefficient at the time of flash emission, which will be described below.

In step S209, the WB control unit 103 again determines whether photographing is performed in the underwater mode. When the photographing is performed in the underwater mode (YES in step S209), the process proceeds to step S211. When photographing is not performed in the underwater mode (NO in step S209), the WB control unit 103 sets the white balance coefficients calculated in step S207 to the final white balance coefficients. On the other hand, in step S211, the WB control unit 103 performs the process of calculating the white balance coefficient during the underwater flash photography to be described below.

Figure 8:
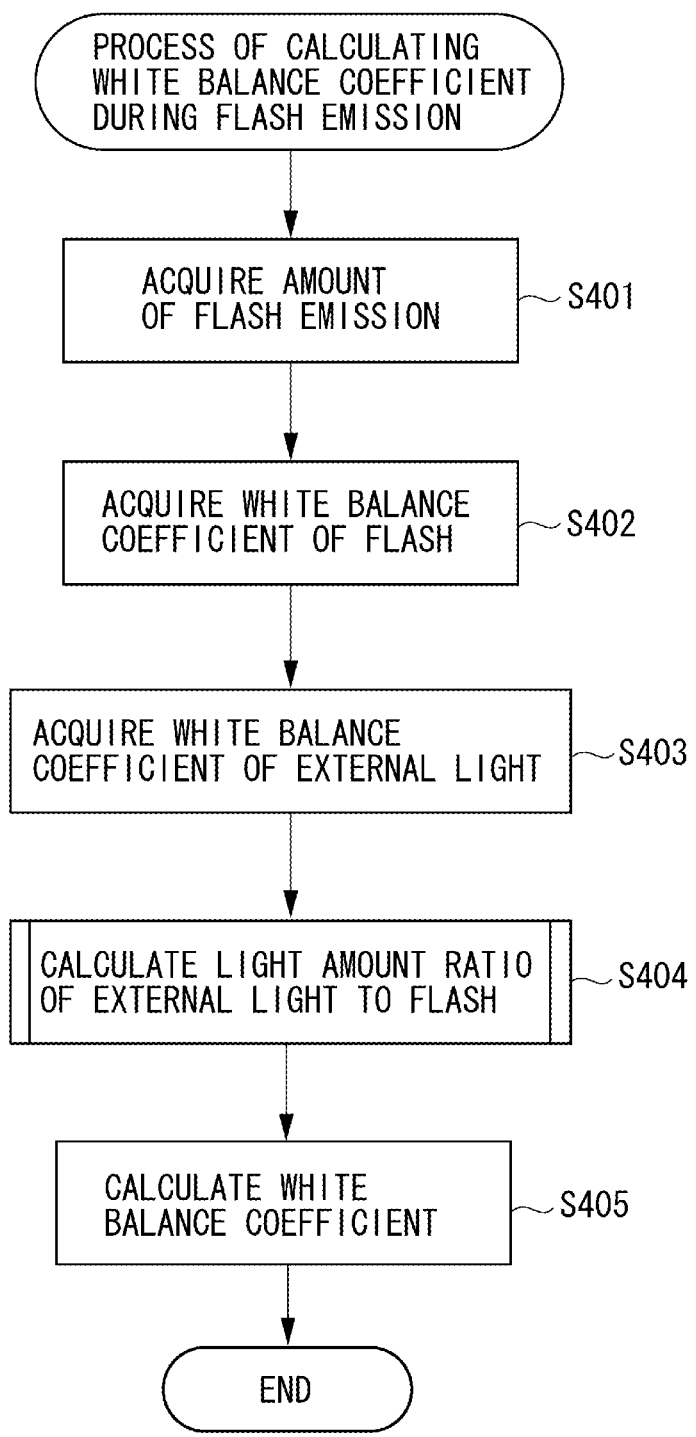
FIG. 8 is a flowchart illustrating a process of calculating white balance coefficients at the time of flash emission.

FIG. 8 is a flowchart illustrating the process of calculating the white balance coefficient at the time of flash emission in step S207. In step S401, the WB control unit 103 acquires an amount of flash emission for light amount control. In step S402, the WB control unit 103 acquires a color temperature of the flash and a white balance coefficient of the flash according to the acquired amount of flash emission.

In general flash, the smaller a light emission amount is, the higher a color temperature is. The larger a light emission amount is, the lower the color temperature is. By measuring the amount of flash emission, the color temperature, and the white balance coefficient in advance, the optimum white balance coefficient corresponding to the amount of flash emission can be acquired.

Figure 4:
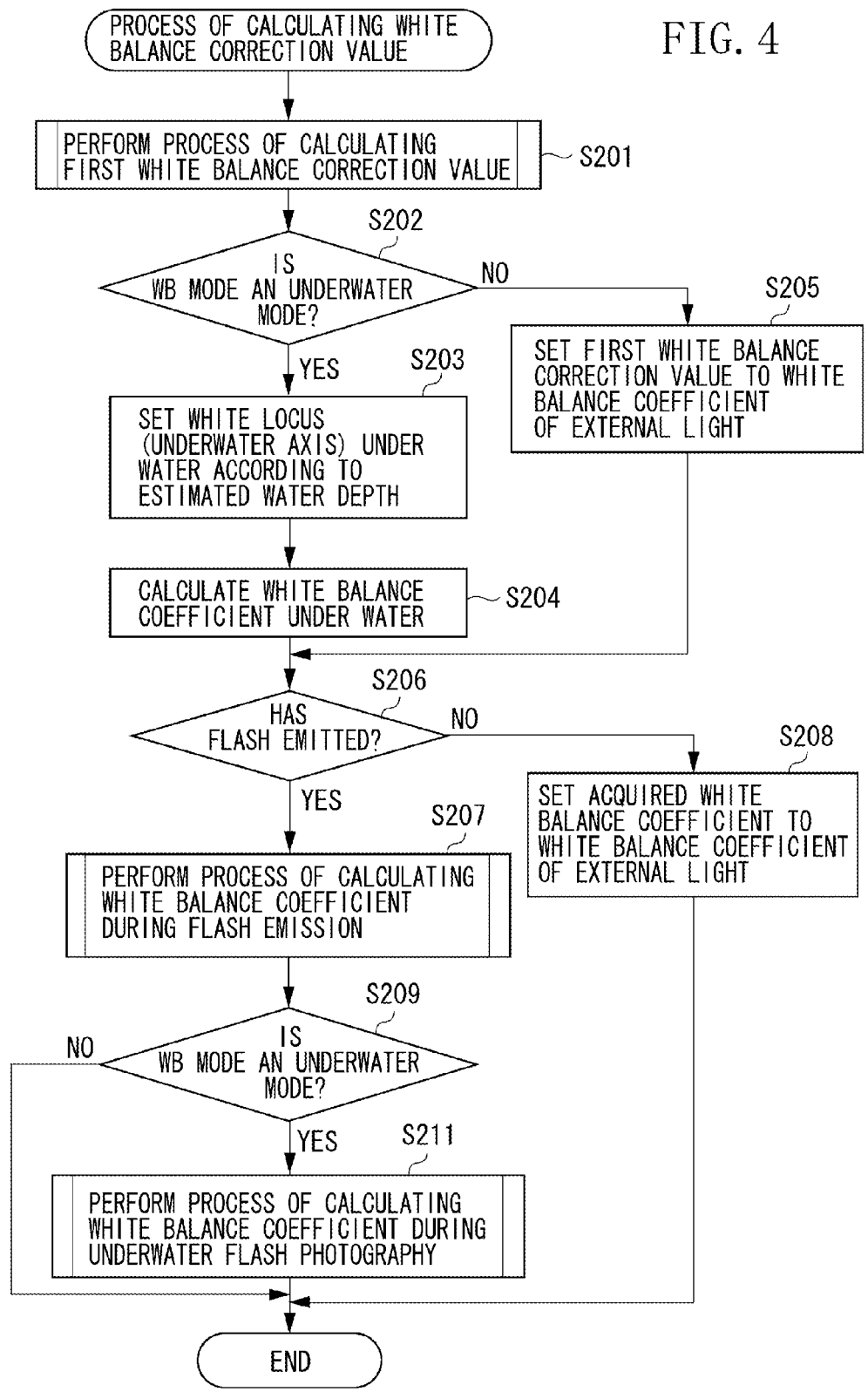
FIG. 4 is a flowchart illustrating a process of calculating a white balance coefficient at the time of underwater flash photography.
Figure 5:
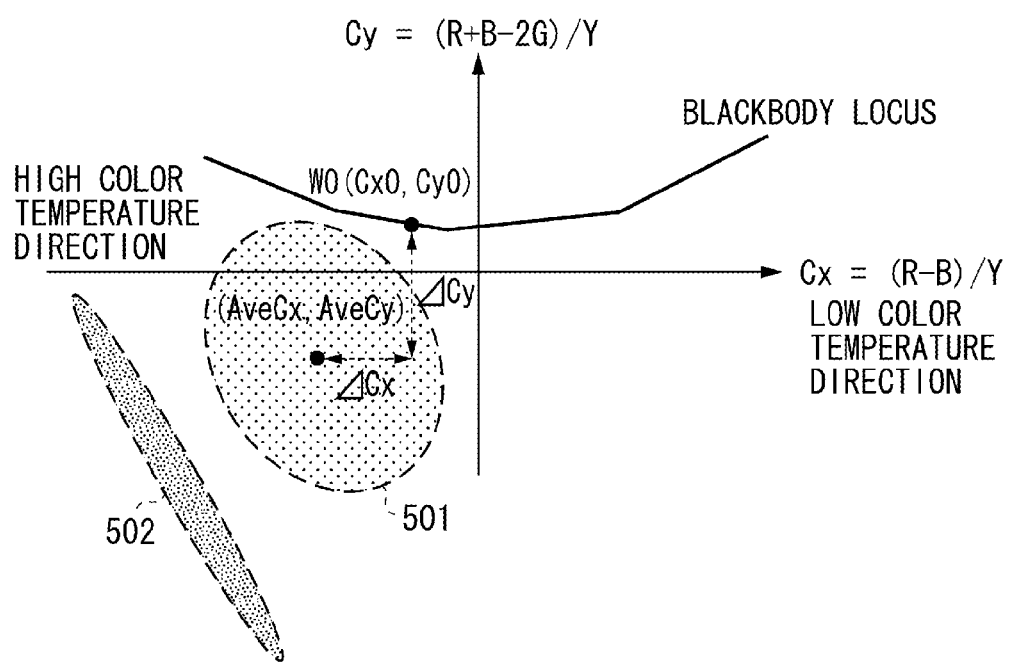
FIG. 5 is a diagram illustrating a color evaluation value distribution at the underwater time.

In step S403, the WB control unit 103 acquires the white balance coefficients of the external light calculated in step S204 or step S205 in FIG. 4. The white balance coefficient underwater calculated in step S204 is one of the white balance coefficients of the external light, since the flash emission is not considered. In step S404, the WB control unit 103 calculates a light amount ratio of the external light to the flash in a main object region. This process will be described in detail below.

In step S405, the WB control unit 103 calculates a white balance coefficient optimum for a main object from the white balance coefficients of the external light and the flash acquired in step S402 and step S403, respectively, according to the light amount ratio calculated in step S404. This process corresponds to an example of a process performed by a first white balance coefficient calculation unit. In general, since light and color have additivity of light, the white balance coefficient can be calculated by linearly interpolating the white balance coefficient itself according to the light amount ratio.

Figure 10:
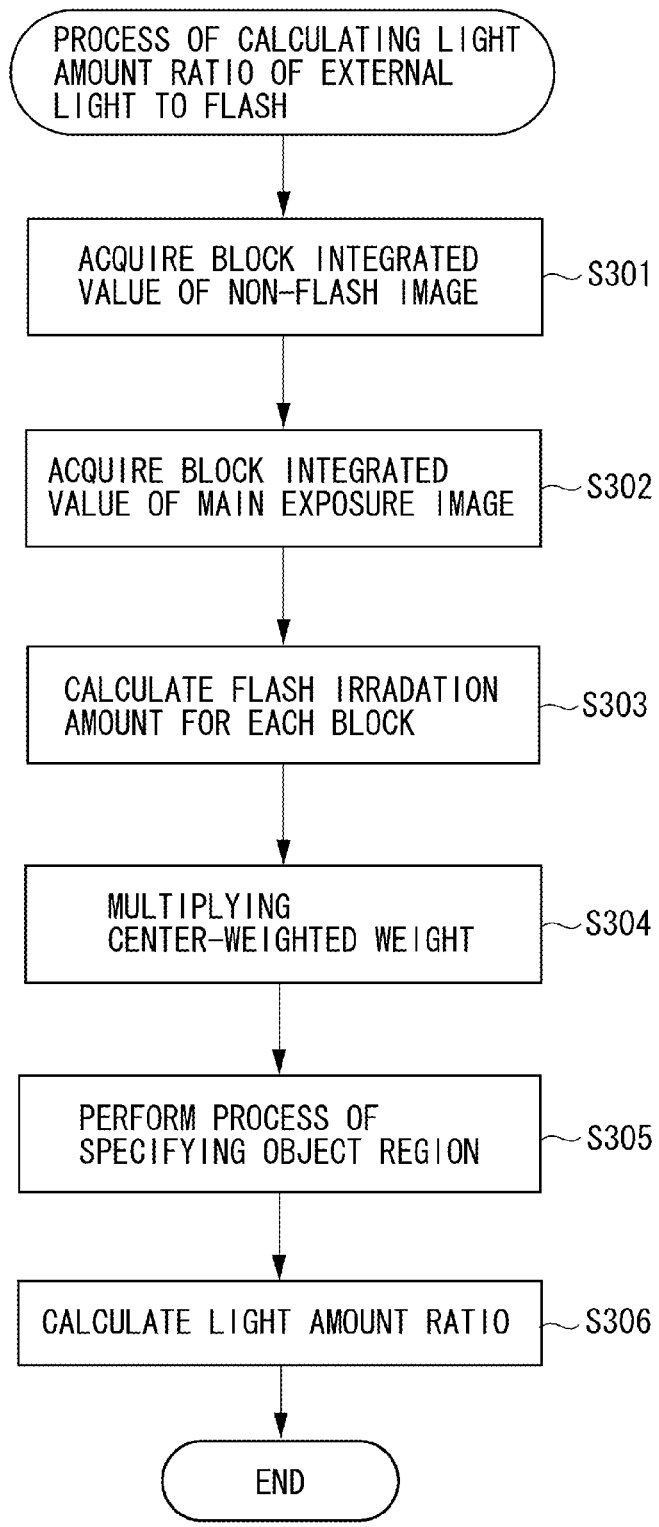
FIG. 10 is a flowchart illustrating a process of calculating a light amount ratio of flash to external light.

FIG. 10 is a flowchart illustrating the process of calculating a light amount ratio of the external light to the flash in the main object in step S404 of FIG. 8. In step S301, the WB control unit 103 acquires a block integrated value of non-flash image immediately before main exposure. In step S302, the WB control unit 103 acquires a block integrated value of a main exposure image. In step S303, the WB control unit 103 calculates a flash irradiation amount (FlashY[i]) and an external light irradiation amount (PreY[i]) for each block in the main exposure image.

A luminance value (PreY'[i]) subjected to a process of converting the luminance value of the non-flash image according to a main exposure photography condition is calculated from a relation between a sensitivity (Sv_pre), an F value (Av_pre), an exposure time (Tv_pre), and a block integrated value (Pre_Y) of the non-flash image and a sensitivity (Sv_cap), an F value (Av_cap), an exposure time (Tv_cap), and a block integrated value CapY (x, y) of the main exposure image. Here, the values such as Sv_pre are expressed by Apex below:

$$PreY'[i]=PreY[i] \times 2^{-((Tv\_pre-Tv\_cap)+(Sv\_Cap-Sv\_pre)+(Av\_pre-Av\_cap))}$$

$$FlashY[i]=CapY[i]-PreY'[i]$$

SV=log 2(ISO/3.125) ISO: ISO sensitivity,
AV: AV=2 log 2(F) F: lens aperture value, and
TV=−log 2(T) T: Exposure time (second).
Here, PreY'[i] corresponds to a light amount of external light at the time of main exposure in each block and FlashY[i] corresponds to a flash irradiation amount in each block at the time of main exposure.

In step S304, the WB control unit 103 multiplies FlashY calculated for each block by a center-weighted weight table (CenterWwight[i]) to give a weight of FlashY (FlashY_wgt[i]).

$$FlashY\_wgt[i]=CenterWeight[i] \times FlashY[i]$$

In step S305, the WB control unit 103 performs a process of specifying the object region. More specifically, sorting is performed in order of high luminance on the value of FlashY_wgt[i]. A region including the upper 50% of the sorted values is maintained as a valid region, and a block including the lower 50% of the sorted values is classified as an invalid region, so that the value of FlashY_wgt[i] is set to be 0. By applying a median filter, noise or a rubbish region, such as a minute flash reflection region, is determined. In a region determined to be the rubbish region, FlashY_wgt[i] value is likewise set to be 0. In regard to the block data calculated in this way, a central region in which flash emission is strong and which has an area equal to or greater than a given area can be extracted, so that this region can be determined to be a main object region (Main_TgtTbl[i]). This process corresponds to an example of a process by an object region specifying unit.

In step S306, the WB control unit 103 calculates an integrated value (FlashLightVal) from the value of FlashY[i] and an integrated value (DayLightVal) from PreY'[i] for the calculated main object region and calculates the light amount ratio (Flash_Ratio) of the external light to the flash by the following expression:

$$FlashLightVal = \sum_m (Main\_TgtTbl[i] \times FlashY[i])$$

$$DaylihgtVal = \sum_m (Main\_TgtTbl[i] \times PreY'[i])$$

$$Flash\_Ratio = \frac{FlashLightVal}{DayLightVal + FlashLightVal}$$

In the exemplary embodiment, the region as close as possible to the center and irradiated with flash is determined to be a main object region, but exemplary embodiments of the invention are not limited thereto. A method of discriminating a face or a method of dividing an image region from information such as a color or brightness and specifying the main object region among the divided regions may be used. Further, the main object region may be specified using a method of recognizing an object by applying an image pattern matching method or the like. As long as the main object region can be specified by such a method, only calculating Main_TgtTbl[i] in the above-described method is altered, and thus the light amount ratio of the flash to the external light in the main region can be calculated in a similar manner.

Figure 11:
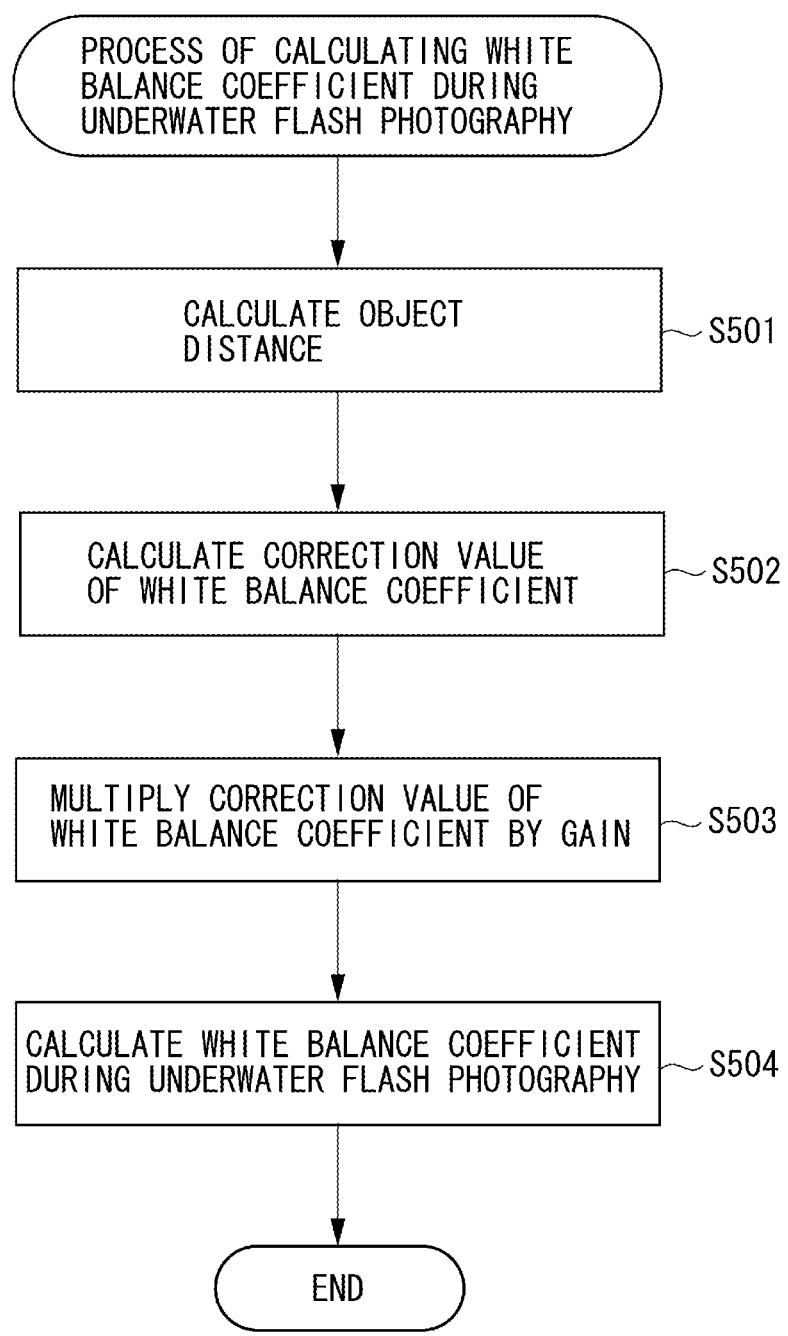
FIG. 11 is a flowchart illustrating a process of calculating a white balance coefficient during underwater flash photography.

FIG. 11 is a flowchart illustrating a process of calculating the white balance coefficient during underwater flash photography in step S211 of FIG. 4. In step S501, the WB control unit 103 calculates an object distance. This process corresponds to an example of a process performed by an object distance calculation unit.

In the exemplary embodiment, a method of calculating the object distance will be described using FlashLightVal, which is the above-described flash irradiation amount. FlashLightVal is generally maintained in a range of a given brightness, since light amount control and correction is appropriately performed normally. In a macro region, for example, the light emission amount of the flash is controlled to be minimum to suppress overexposure. However, the flash irradiation amount increases compared to that in a normal object distance. That is, when the flash irradiation amount is large, the probability increases which the object distance is close.

As a method for measuring the object distance other than the method of measuring the flash irradiation amount, a method of using an optical distance measurement result, that is, using general AF or the like, may be considered. The general AF detects the main object region and calculates values regarding an object distance up to the main object region.

In step S502, the WB control unit 103 calculates a correction value (an offset value) of the white balance coefficient according to the object distance. This process corresponds to an example of a process performed by a correction value calculation unit. In this case, the correction value is a value for performing correction in a direction in which red in an image is removed, and a direction in which a white balance coefficient corresponding to an object approaches a white balance coefficient of the flash on a straight line between the white balance coefficient corresponding to the object and the white balance coefficient of the flash. Here, the white balance coefficient corresponding to the object is the white balance coefficient calculated in step S504 (step S207) and the white balance coefficient of the flash is the white balance coefficient calculated in step S402.

Figure 12A:
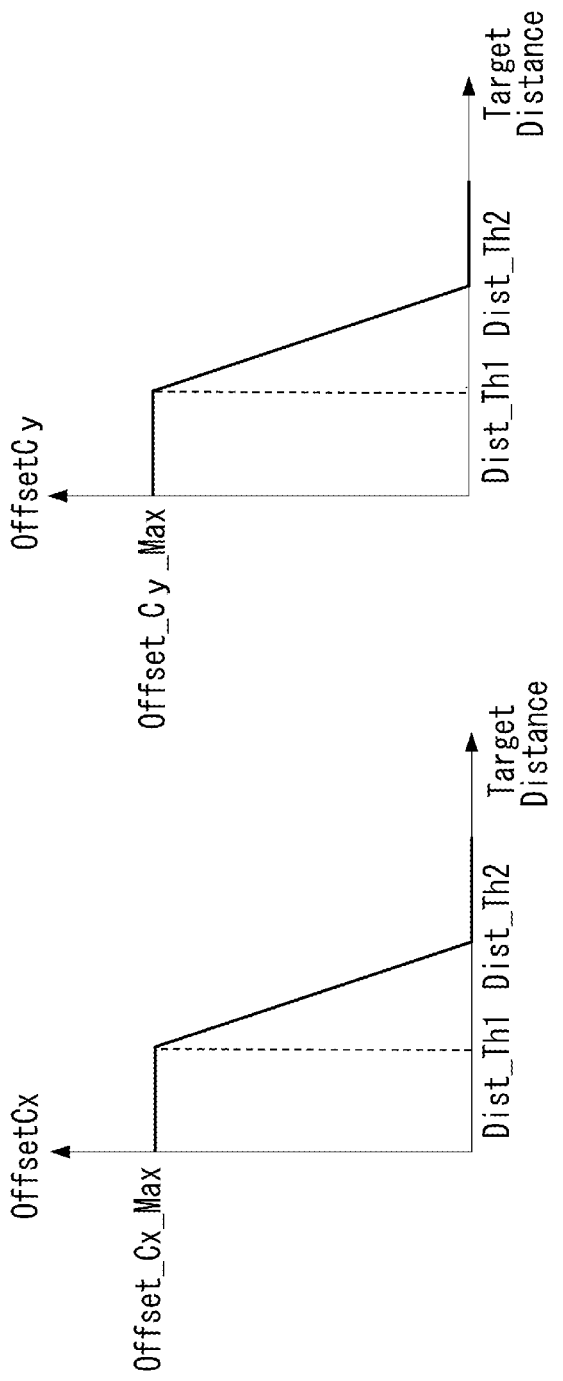
FIGS. 12A and 12B are diagrams illustrating the concept of a process of calculating correction values of the white balance coefficients during the underwater flash photography.
Figure 12B:
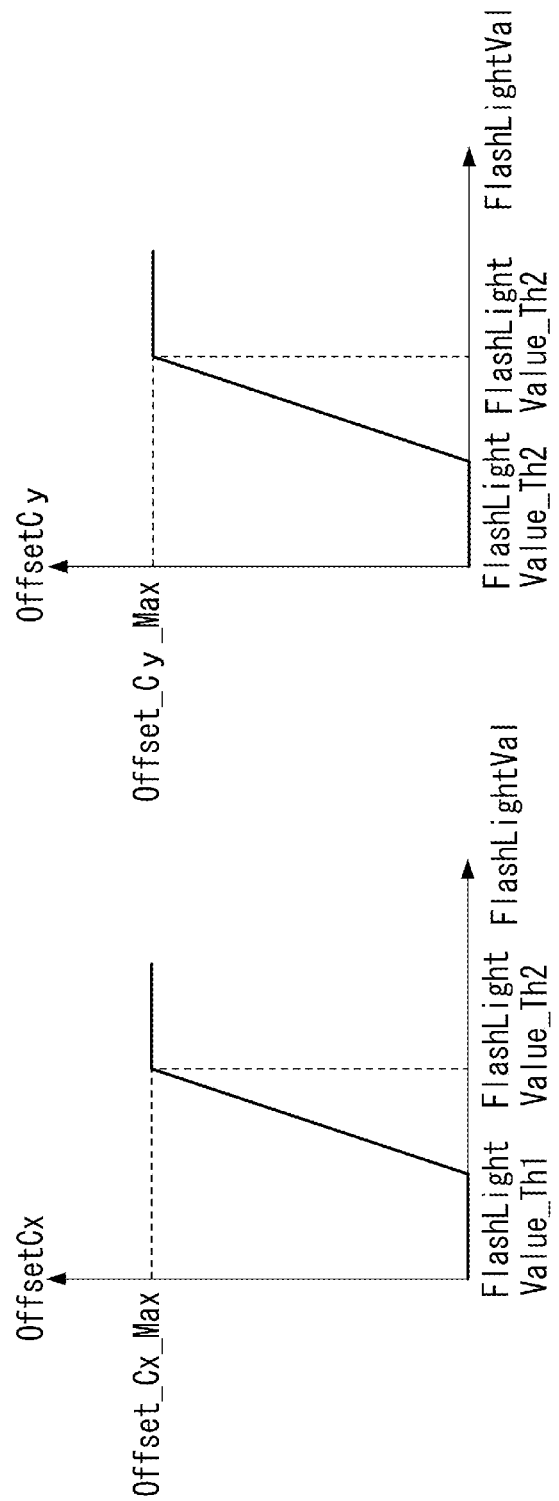

FIGS. 12A and 12B are diagrams illustrating the concept of a process of calculating the correction values of the white balance coefficients during the underwater flash photography. FIG. 12A is the diagram illustrating a calculation example of the correction value of the white balance coefficient from the information regarding the object distance. When the object distance has a distance equal to or smaller than a given distance (when the object distance is equal to or less than a predetermined distance), a large correction value of the white balance coefficient is calculated in the graph. As another method using the AF information, the distance of the main object and a distance of the closest region in a background region may be calculated and a white balance coefficient correction process may be varied according to a ratio of the closest distance to the main object. More specifically, when there is a region on the near side of the main object in the region excluding the main object, the correction value of the white balance coefficient may be varied according to a variation ratio of the distance. Of course, when the region excluding the main object is on the back side of the main object, it is not necessary to perform the correction.

FIG. 12B is the diagram illustrating an example of direct calculation of the correction value of the white balance coefficient according to the flash irradiation amount. When the flash irradiation amount is equal to or greater than a given amount, the correction value of the white balance coefficient is considerably varied in the graph. As described above, the advantage equivalent to the advantage obtained by referring to the distance of the AF can be obtained, even when the flash irradiation amount in the macro region, particularly, in an image is considered as the object distance.

In step S503, the WB control unit 103 multiplies the correction value of the white balance coefficient calculated in step S502 by a gain according to an estimated value of the water depth, as in the following expression:

Offset_Cx'=Offset_Cx×Gain3, and

Offset_Cy'=Offset_Cy×Gain3.

Figure 13:
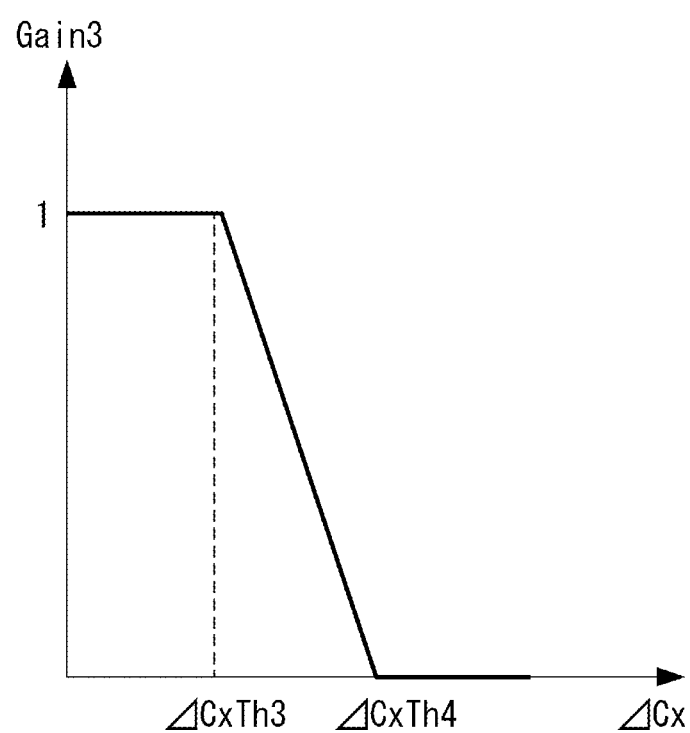
FIG. 13 is a diagram illustrating the concept of a process of varying the correction values of the white balance coefficient according to a distance from a blackbody locus.

More specifically, when the water depth is shallow, the correction value of the white balance coefficient is set to decrease. When the water depth is deep, the correction value of the white balance coefficient is set to increase. Here, the estimated value of the water depth may be the correlation coefficient $r^2$ described in step S203 or may be calculated from the value of the change amount ΔCx, ΔCy of the distance to the blackbody locus. FIG. 13 is a diagram illustrating a calculation example of gain Gain3 according to the distance from the blackbody locus.

The reason why a flash photo taken under water is an unnatural image due to red is that a white point of a lone flash and a white point of flash emitted in the water are considerably different from each other. That is, when the white balance is adjusted to either one of the white points, the white balance of the other white point may not be adjusted. As a difference between the white points increases, in other words, as the water depth is deeper, the image has unnatural color in a region in which the white points are not adjusted. Specifically, it is meant that, when the white point is adjusted so that the white balance is appropriate for the main object and there is a region which is irradiated with the flash more strongly than the main object, red is strong in the region and the image becomes unnatural.

On the other hand, in a case in which the water depth is shallow, it is less necessary to perform correction of removing red in the flash image in which the white points of the flash and the flash emitter under water are not considerably changed. That is, by performing the white balance correction using the white balance coefficient during the underwater flash photography according to the water depth, a desired image can be obtained.

In step S504, the WB control unit 103 calculates the white balance coefficient during the underwater flash photography. This process corresponds to an example of a process performed by a second white balance coefficient calculation unit. More specifically, the WB control unit 103 converts the white balance coefficient calculated in step S207 in FIG. 4 into the values of Cx and Cy and adds the offset value calculated in step S503 described above to calculate the white balance coefficient again. The white balance coefficient calculated in this way is the white balance coefficient during the underwater flash photography. Then, the WB control unit 103 can appropriately adjust the white balance at the time of underwater flash emission by performing the white balance correction using the calculated white balance coefficient during the underwater flash photography.

The estimated value of the water depth is calculated not only by the above-described method but also by a method using an output result of an indicator for depth, a pressure sensor, and the like. Alternatively, the estimated value of the water depth may be calculated from another image feature amount such as an average luminance, a variation amount of time-series luminance, and white balance of a screen, or a result of.

In the exemplary embodiment, a first white balance coefficient is calculated based on a light amount ratio of external light to flash and a second white balance coefficient is calculated by correcting the first white balance coefficient according to an object distance at the time of underwater photography. Since the white balance is corrected to remove red of an image by correcting the white balance using the second white balance coefficient, the white balance can be appropriately adjusted at the time of underwater flash emission.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-001537 filed Jan. 6, 2012, which is hereby incorporated by reference herein in its entirety.

What is claimed is:

1. An imaging apparatus configured to perform white balance correction on an image captured underwater with flash emission, the imaging apparatus comprising: a memory device configured to load instruction into at least one processor, and the at least one processor, wherein the at least one processor is configured to:

specify an object region irradiated with flash by the flash emission;

calculate a first white balance coefficient based on a light amount of flash and external light for the specified object region;

calculate an object distance from the imaging apparatus;

calculate a correction value to be used to correct the first white balance coefficient based on the calculated object distance; and calculate a second white balance coefficient by correcting the first white balance coefficient with the correction value, wherein the correction value is calculated so that a correction amount of the first white balance coefficient increases as the distance of the region excluding a main object from the imaging apparatus becomes smaller than the calculated distance of the main object from the imaging apparatus.

2. The imaging apparatus according to claim 1, wherein the second white balance coefficient is calculated to correct the white balance so that red is removed compared to the calculated first white balance coefficient.

3. The imaging apparatus according to claim 1, wherein the object distance is calculated according to a flash irradiation amount calculated for each of a plurality of image regions.

4. The imaging apparatus according to claim 1, wherein the object distance is calculated using optical information calculated for the object region.

5. The imaging apparatus according to claim 1, wherein a first white balance coefficient is calculated by linearly interpolating a white balance coefficient for the flash and a white balance coefficient for the external light based on a light amount ratio between the flash and the external light.

6. A method for controlling an imaging apparatus configured to perform white balance correction on an image captured with flash emission, the method comprising:
   specifying an object region irradiated with flash by the flash emission;
   calculating a first white balance coefficient based on a light amount of flash and external light for the specified object region;
   calculating an object distance from the imaging apparatus;
   calculating a correction value to be used to correct the first white balance coefficient based on the calculated object distance; and
   calculating a second white balance coefficient by correcting the first white balance coefficient with the correction value,
   wherein the correction value is calculated so that a correction amount of the first white balance coefficient increases as the distance of the region excluding a main object from the imaging apparatus becomes smaller than the calculated distance of the main object from the imaging apparatus.

7. A non-transitory computer-readable storage medium storing instructions that when executed cause a computer to perform a method for controlling an imaging apparatus configured to perform white balance correction on an image captured with flash emission, the method comprising:
   specifying an object region irradiated with flash by the flash emission;
   calculating a first white balance coefficient based on a light amount of flash and external light for the specified object region;
   calculating an object distance from the imaging apparatus;
   calculating a correction value to be used to correct the first white balance coefficient based on the calculated object distance; and
   calculating a second white balance coefficient by correcting the first white balance coefficient with the correction value,
   wherein the correction value is calculated so that a correction amount of the first white balance coefficient increases as the distance of the region excluding a main object from the imaging apparatus becomes smaller than the calculated distance of the main object from the imaging apparatus.

* * * * *